US009845696B2

(12) United States Patent
Lefebvre et al.

(10) Patent No.: US 9,845,696 B2
(45) Date of Patent: Dec. 19, 2017

(54) TURBINE SHROUD SEALING ARCHITECTURE

(71) Applicant: Pratt & Whitney Canada Corp., Longueuil (CA)

(72) Inventors: Guy Lefebvre, St-Bruno-de-Montarville (CA); Rene Paquet, Montreal (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 637 days.

(21) Appl. No.: 14/570,139

(22) Filed: Dec. 15, 2014

(65) Prior Publication Data

US 2016/0169037 A1    Jun. 16, 2016

(51) Int. Cl.
*F01D 11/00* (2006.01)
*F01D 11/08* (2006.01)
*F01D 25/12* (2006.01)

(52) U.S. Cl.
CPC .................................. *F01D 11/005* (2013.01)

(58) Field of Classification Search
CPC ...... F01D 11/001; F01D 11/005; F01D 25/08; F01D 25/12
See application file for complete search history.

(56) References Cited

U.S. PATENT DOCUMENTS

| 4,157,232 | A | * | 6/1979 | Bobo | ...................... F01D 11/08 415/116 |
| 5,738,490 | A | * | 4/1998 | Pizzi | ...................... F01D 11/005 415/139 |
| 8,118,547 | B1 | | 2/2012 | Liang | |
| 8,133,014 | B1 | | 3/2012 | Ebert et al. | |
| 8,157,511 | B2 | | 4/2012 | Pietrobon et al. | |
| 8,240,980 | B1 | | 8/2012 | Liang | |
| 2010/0014985 | A1 | * | 1/2010 | Jain | ........................ F01D 11/08 416/97 R |

* cited by examiner

*Primary Examiner* — Nathaniel Wiehe
*Assistant Examiner* — Brian O Peters
(74) *Attorney, Agent, or Firm* — Norton Rose Fulbright Canada LLP

(57) ABSTRACT

A shroud sealing arrangement for a gas turbine engine, which comprises a static shroud assembly mounted to an engine case and having a platform surrounding a rotatable airfoil array. The platform has an inner side and an outer side and extends from a leading edge to a trailing edge. A shroud support structure mounts the shroud platform to the case. A circumferential groove is defined on the outer side of the shroud platform proximal to one of the leading edge and the trailing edge. A sealing ring is set in the groove and adapted to seal cooling air from escaping directly to the gas path.

14 Claims, 4 Drawing Sheets

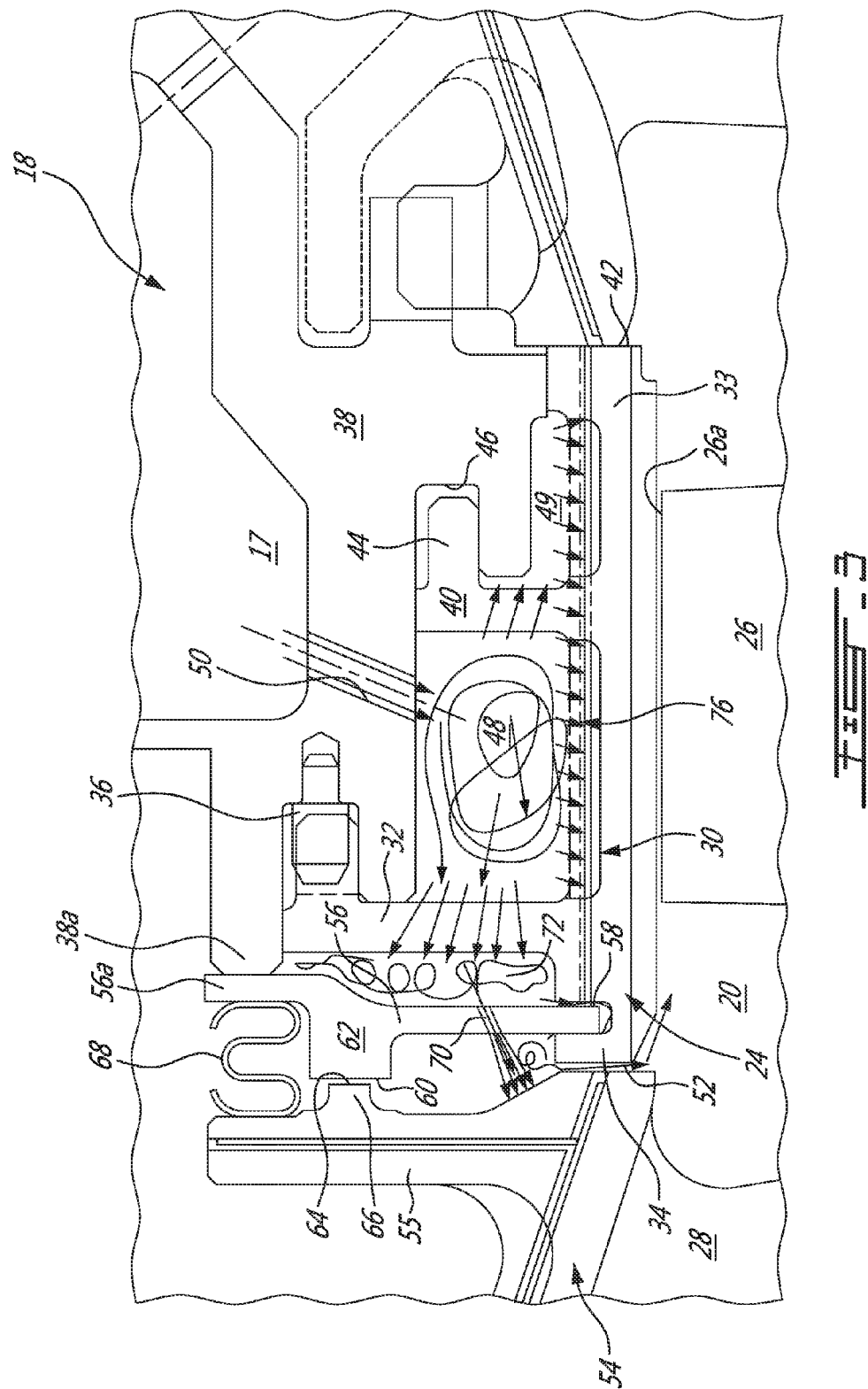

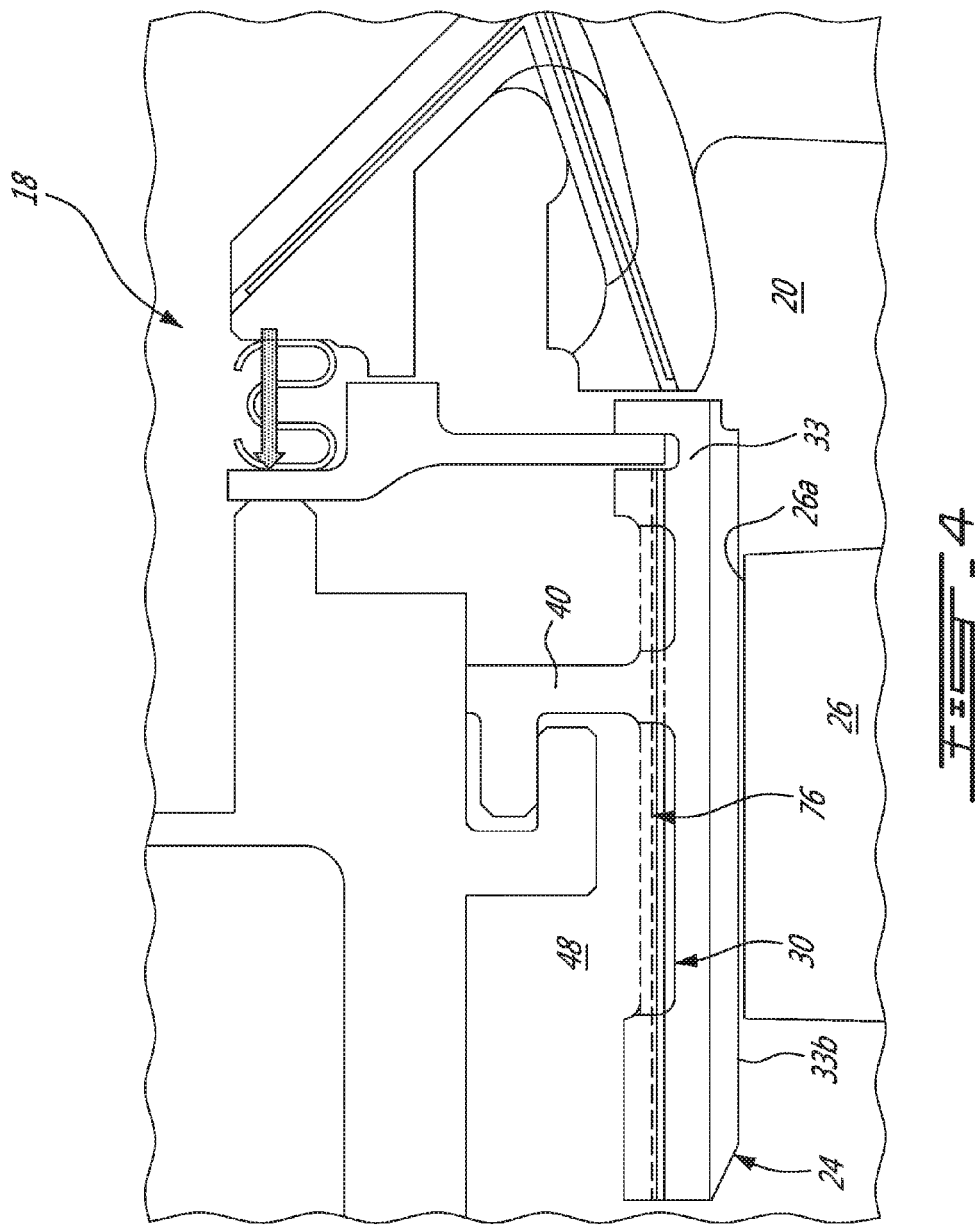

TURBINE SHROUD SEALING ARCHITECTURE

TECHNICAL FIELD

The application relates generally to gas turbine engines and, more particularly, to static shroud assemblies for rotor blade arrays.

BACKGROUND OF THE ART

Typically, an axial gap is provided between a turbine shroud and the outer wall of a gas path duct at ambient temperatures, to allow for thermal expansion of the duct and/or the turbine shroud at engine operating temperatures. The magnitude of such thermal expansion can be predicted, and the gap sized, so that thermal expansion generally seals the gap to prevent leakage through the gap.

However, the seal is not perfect and it must be ensured to adequately purge the adjacent cavity with sufficient cooling air to avoid hot gas ingestion. Reducing such uses of secondary air can increase gas turbine engine efficiency.

Accordingly, there is a need for an improved turbine shroud sealing arrangement.

SUMMARY

In one aspect, there is provided a shroud sealing arrangement for a gas turbine engine, the arrangement comprising: a static shroud assembly mounted to an engine case and having a circumferential array of shroud segments surrounding a rotatable blade array, the shroud segments each having a platform, the platform having a radially inner side and a radially outer side and extending axially from a leading edge to a trailing edge, and a forward leg and an aft leg extending radially outwardly from the radially outer side of the platform; a shroud support structure engaged with the forward and aft legs of the shroud segments for mounting the shroud segments to the engine case; a circumferentially extending groove defined on the radially outer side of the shroud segments proximal to one of the leading edge and the trailing edge; and a sealing ring mounted in the circumferentially extending groove, the sealing ring cooperating with the shroud support structure to define a cooling air plenum with one of said forward and aft legs.

In another aspect, a gas turbine engine has a circumferential array of shroud segments surrounding a rotatable blade array in a gas path whereby the shroud segments are secured to an engine case by a shroud support structure. An adjacent stator vane assembly forms a gap with the array of shroud segments. An annular slot is defined in the shroud segments near the gap and a radial sealing ring is set in the slot for sealing cooling air to the array of shroud segments.

In accordance with another aspect, there is provided a method for cooling the shroud segments of a circumferential array of shroud segments surrounding a rotatable turbine blade array in a gas path, the shroud segments each having forward and aft legs extending radially outwardly from a radially outer surface of a platform, the method comprising: capturing cooling air leaking from between the forward or aft legs in a cooling air plenum closing a leading edge or trailing edge cavity of the shroud segments, and reusing said cooling air to provide impingement cooling on an adjacent component.

In accordance with a still further general aspect, there is provided a method for cooling the shroud segments of a circumferential array of shroud segments surrounding a rotatable turbine blade array in a gas path, the method including: supplying cooling air to the array of shroud segments, sealing the cooling air in the area of the shroud segments by defining a radially outwardly facing annular slot near an edge of the shroud segments; providing a sealing ring in the slot and providing discharge ports in the sealing ring

DESCRIPTION OF THE DRAWINGS

Reference is now made to the accompanying figures, in which:

FIG. 3 is a schematic, fragmentary view in axial cross-section of the turbine shroud area similar to FIG. 2, but showing the cooling air flow and FIG. 4 is a schematic, fragmentary view in axial cross-section of the turbine shroud area of the engine in accordance with another embodiment.

DETAILED DESCRIPTION

Figure 1:
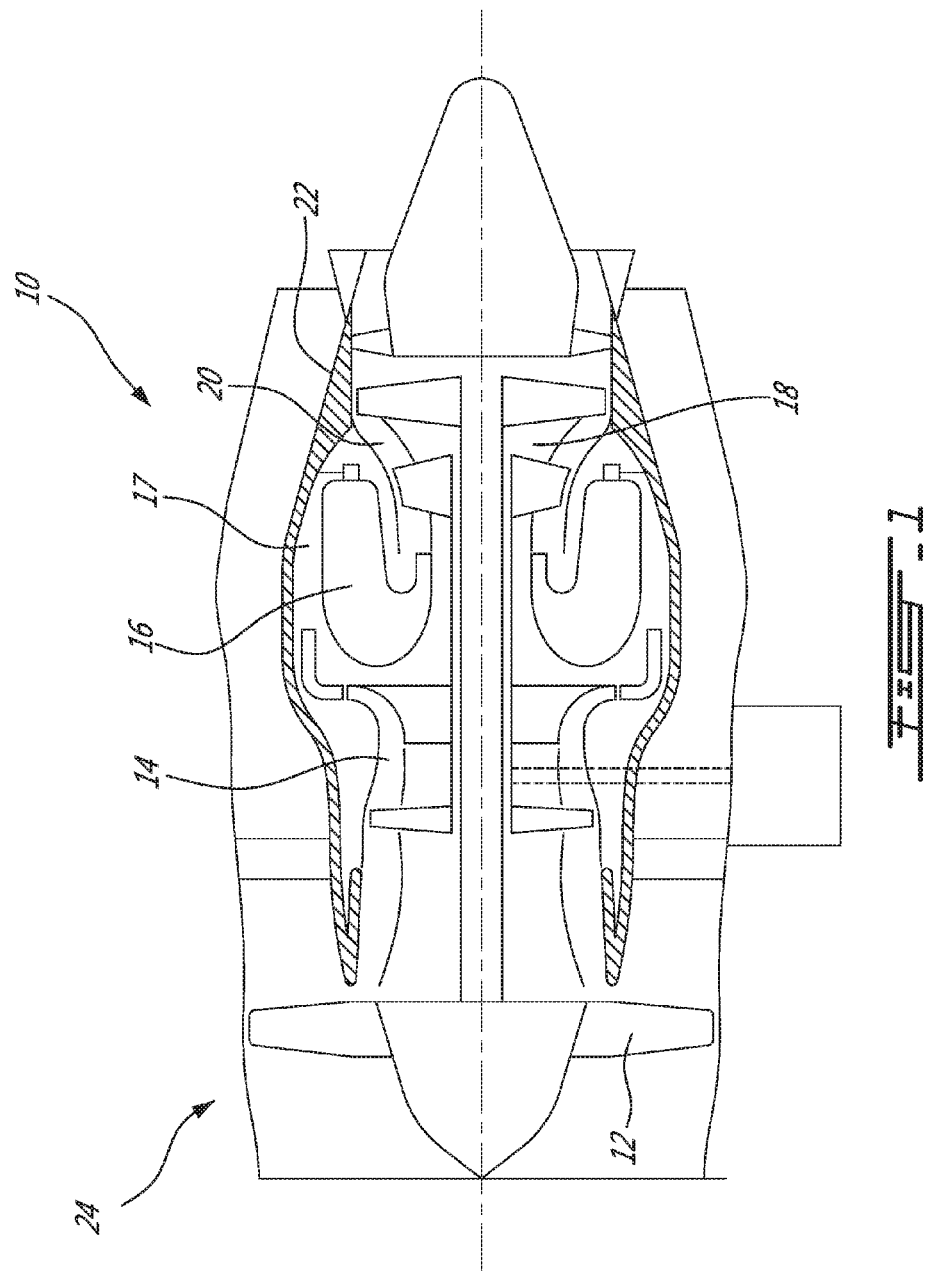
FIG. 1 is a schematic, cross-sectional view of a turbofan engine having a reverse flow annular combustor.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. A gas path 20 carries the hot combustion gases from the combustor through the turbine section 18 for powering the turbines.

Figure 2:
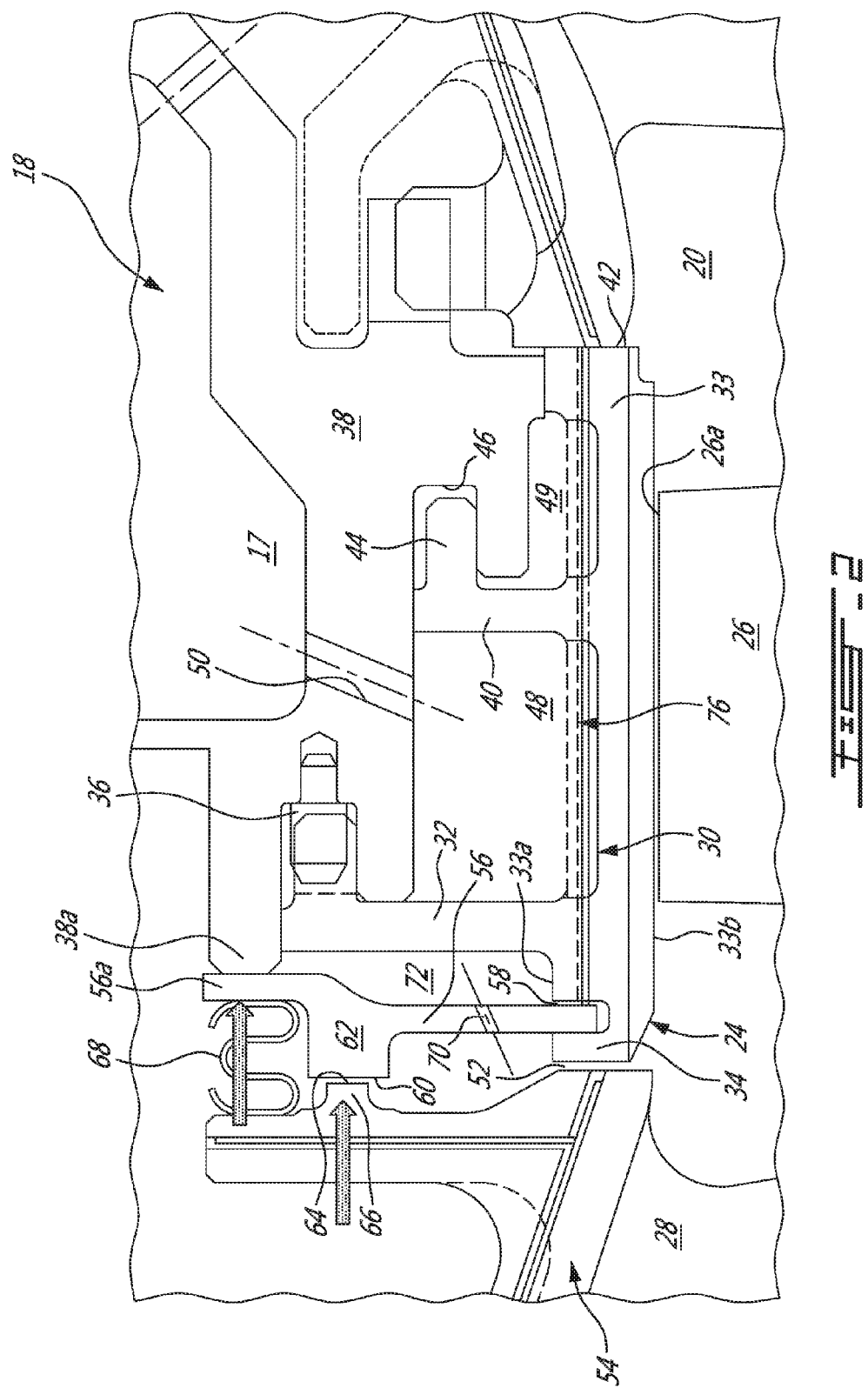
FIG. 2 is a schematic, fragmentary view in axial cross-section of the turbine shroud area of the engine shown in FIG. 1.

The combustor 16 is housed in a plenum 17 supplied with compressed air from compressor 14. The turbine section 18 is also surrounded by the plenum 17, defined within the engine case 22, for supplying cooling air to a turbine shroud surrounding the turbine blades 26 (see FIG. 2). The turbine section 18 generally comprises one or more stages of turbine blades 26 extending radially outwardly from respective rotor disks, with the blade tips 26a being disposed closely adjacent to an annular turbine shroud 24 supported from the engine case 22. The shroud 24 is typically circumferentially segmented. FIGS. 2 and 3 illustrate an example of one such turbine shroud segments 30. The various stages of turbine blades 26 are arranged in the gas path 20 with alternating stator vanes 28.

As seen in FIG. 2, each shroud segment 30 comprises axially spaced-apart forward and aft hooks or legs 32 and 40 extending radially outwardly from a back side or cold radially outer surface 33a of an arcuate platform 33. The platform 33 has an opposite radially inner hot gas flow surface 33b adapted to be disposed adjacent to the tip 26a of the turbine blades 26. The platform 33 is axially defined from a leading edge 34 to a trailing edge 42 in a direction from an upstream position to a downstream position of a hot gas flow passing through gas path 20, and being circumferentially and longitudinally defined between opposite lateral sides.

The forward leg 32 is disposed just downstream of the leading edge 34 of the platform 33. The leg 32 includes a fastener device 36, extending, axially downstream of the leg 32. The fastener device 36 engages a shroud support housing 38 mounted to the engine case 22.

The aft leg 40 is disposed upstream of the trailing edge 42 of the platform 33. A projection 44 extends downstream and axially from the leg 40. The projection 44 engages a corresponding axial recess 46 defined in the shroud support housing 38. A cooling air chamber 48 is defined between the shroud support housing 38 and the forward and aft legs 32, 40 of the shrouds segments 30. Bores 50 traverse the shroud support housing 38 and communicate the plenum 17 with the cooling air chamber 48.

Axial gaps 52 are typically provided between the stator shroud 54 and the leading edge 34 of the shroud segments 30 to provide for thermal expansion. Cooling air can escape through the gaps 52 to exhaust into the gas path 20.

A circumferentially extending slot or groove 58 is defined in the radially outer surface 33a of the platform 33 of the shroud segments 30 axially between the leading edge 34 and the forward leg 32. The grooves 58 of the shroud segments 30 collectively form a full or 360 degrees groove. A 360 degrees sealing ring 56 is mounted in the full circumferential groove 58 formed by the shroud segments 30. The sealing ring 56 may be provided in the form of a lightweight, annular metal plate.

As shown in FIG. 2, the outer portion 56a, of sealing ring 56, may axially contact the sealing surface 38a of the shroud support housing 38. A circumferential W seal 68 is also resilient and adds pressure to the annular ring 56 to engage the seal surface 38a. An axial, contact sealing surface 60 is defined on a short axial stub 62 which projects upstream from the annular ring 56 radially inwardly from the outer or peripheral portion 56a. Part of the stator shroud aft support leg 55 includes a contact surface 64 defined on a short axial stub 66 opposed to the contact surface 60. Surfaces 60 and 64 form contact sealing faces in running conditions.

Referring now to FIG. 3, which is identical to FIG. 2, there is shown by way of arrows the movement of the cooling air emanating from the plenum 17. The cooling air enters the shroud array 24 through the bores 50 in the shroud support housing 38 to the cooling air chamber 48. As there is no feather seal on the forward legs 32 of the shroud segments 30, the air, under pressure, within the cooling air chamber 48 will leak through the interface between adjacent forward legs 32 of the shroud segments 30. This leakage air is received in a cooling air plenum 72 defined between the annular ring 56 and the forward leg 32 of the shroud segments 30. The air in plenum 72 provides cooling along all the length of the forward leg 32. It also provides for a better cooling of the leading edge region of the platform. This contributes to improve shroud durability. It also eliminates the need for multiple feather seals between the forward legs of the shroud segments. Air also passes by the aft legs 40 in order to enter the plenum 49 where the cooling air can impinge on the downstream portion of the platform of the shroud segments 30. Along the axial length of the platform 33 of the shroud segments 30 are feather seals 76 and cooling air impinges on the shroud segment 30, between the feather seals 76.

Cooling air passes from the plenum 72 through impingement holes 70 defined in the sealing ring 56. The holes 70 may be evenly distributed on a circumferential row and oriented so as to aim at the back face of the adjacent stator shroud 54. The size and number of discharge ports or holes will be determined by design criteria for a given engine. As depicted by the arrows in FIG. 3, the air passing through the holes 70 impinges on the back face of the stator shroud 54. The air may then be used to purge the gap 52 formed between the stator shroud 54 and the annular ring 56 as well as the leading edge 34 of the shroud segments 30.

Reusing the cooling air to cool the adjacent component (the stator shroud) and to purge the gap between the shroud segments and the adjacent component allows to reduce the amount of cooling air and, thus contributes to the engine efficiency. The 360 degrees sealing plate architecture also provides better control of cooling air leakage as compared to individual feather seals.

During operation, the hot environment of the gas path 20 causes the shroud segments 30 and the stator vane shroud 54 as well as shroud support 55 to expand axially towards each other so that the contact surfaces 60 and 64 of the stubs 62 and 66 respectively sealingly engage each other, thus providing a seal against the loss of the cooling air into the gas path 20. At the same time, the W seal 68 is compressed so that the outer portion 56a of the sealing ring 56 abuts the contact surface 38a in a sealing arrangement. However a nominal amount of cooling air loss is acceptable. The spent cooling air once into the gas path 20 may form a cooling film along the outer surface of the shroud segments 30.

The above description is meant to be exemplary only, and one skilled in the art will recognize that changes may be made to the embodiment described without departing from the scope of the invention disclosed. For example, the sealing ring 56 can be provided with different configurations, and is not limited to application in turbofan engines. Furthermore the spring shown in the drawings can have different configurations and need only be resilient. Also, as shown in FIG. 4, the sealing ring could be mounted in an associated groove defined in the radially outer surface of the platform axially between the aft leg and the trailing edge of the platform to provide sealing along the aft leg and ensure proper cooling thereof. Still other modifications which fall within the scope of the present invention will be apparent to those skilled in the art, in light of a review of this disclosure, and such modifications are intended to fall within the appended claims.

What is claimed is:

1. A shroud sealing arrangement for a gas turbine engine, the arrangement comprising:

a static shroud assembly mounted to an engine case adjacent a stator vane assembly, the static shroud assembly and the stator vane assembly defining an axial gap therebetween, the static shroud assembly having a circumferential array of shroud segments surrounding a rotatable blade array, the shroud segments each having a platform, the platform having a radially inner side and a radially outer side and extending axially from a leading edge to a trailing edge, and a forward leg and an aft leg extending radially outwardly from the radially outer side of the platform;

a shroud support structure engaged with the forward and aft legs of the shroud segments for mounting the shroud segments to the engine case;

a circumferentially extending groove defined on the radially outer side of the shroud segments proximal to one of the leading edge and the trailing edge; and a sealing ring mounted in the circumferentially extending groove, the sealing ring cooperating with the shroud support structure to define a cooling air plenum with one of said forward and aft legs, wherein the stator vane assembly has an axially facing seal contact surface and the sealing ring has a cylindrical stub extending axially towards the stator vane assembly and having a corresponding sealing contact surface adapted to engage the axially facing sealing contact surface of the stator vane assembly to seal an outer area of the axial gap when the engine is in operation and the thermal, axial expansion of the shroud assembly and the stator vane assembly has caused the axial gap to be reduced.

2. The shroud sealing arrangement defined in claim 1, wherein air passages are defined in the shroud support structure to direct cooling air in a cooling chamber defined between the forward and aft legs of the shroud segments, and wherein the cooling air plenum defined by the sealing ring is in fluid flow communication with the cooling chamber.

3. The shroud sealing arrangement defined in claim 1, wherein impingement holes are defined in the sealing ring, the impingement holes aiming at an adjacent structure to direct impingement jets thereagainst.

4. The shroud sealing arrangement as defined in claim 1, wherein the sealing ring has an axial sealing face at a peripheral outer end thereof, the axial sealing face being in sealing engagement with a corresponding sealing face of the shroud support structure.

5. The shroud sealing arrangement as defined in claim 2, wherein the static shroud assembly is upstream the stator vane assembly, the sealing ring being mounted between the leading edge and the forward leg, and wherein the sealing ring is provided with holes allowing cooling air from the cooling chamber to be reused to purge the axial gap.

6. The shroud sealing arrangement as defined in claim 1, wherein the shroud support structure has a circumferentially extending front sealing contact surface and the sealing ring has a cylindrical stub extending downstream thereof and having a contact surface adapted to engage the circumferentially extending front sealing contact surface of the shroud support structure to seal the cooling air within the shroud assembly.

7. The shroud sealing arrangement as defined in claim 1, wherein a resilient, circumferential seal is provided between the stator vane assembly and the sealing ring at an outer radial portion thereof in order to bias the sealing ring in sealing contact with the shroud support structure.

8. A gas turbine engine having a circumferential array of shroud segments surrounding a rotatable blade array in a gas path; the shroud segments secured to an engine case by a shroud support structure, an adjacent stator vane assembly forming a gap with the array of shroud segments; air passages in the shroud support structure to allow cooling air to contact the shroud segments; an annular slot defined in the shroud segments adjacent the gap, a sealing ring set in the slot for sealing cooling air to the array of shroud segments, and a resilient circumferential seal between the stator vane assembly and the sealing ring at an outer radial position thereof, the resilient circumferential seal biasing the sealing ring in sealing contact with the shroud support structure.

9. In the gas turbine engine as defined in claim 8, wherein the shroud support structure has a circumferential sealing contact surface and the sealing ring includes a cylindrical stub extending downstream thereof and having a contact surface adapted to engage the circumferential sealing contact surface of the shroud support structure to seal the cooling air within the shroud assembly; and wherein the stator vane assembly has an annular sealing contact surface and the sealing ring includes a cylindrical stub having a corresponding contact surface adapted to engage the annular sealing contact surface of the stator vane assembly to seal the outer area of the gap when the engine is in operation and the thermal, axial expansion of the shroud segments and the stator vane assembly has caused the gap to be reduced.

10. In the gas turbine engine as defined in claim 9, the sealing ring is provided with impingement holes allowing cooling air to be discharged into the gap to impinge on the stator vane assembly and exhausting to the gas path.

11. A method for cooling shroud segments of a circumferential array of shroud segments surrounding a rotatable turbine blade array in a gas path, the shroud segments each having forward and aft legs extending radially outwardly from a radially outer surface of a platform, the method comprising: capturing cooling air leaking from between forward legs of adjacent shroud segments or aft legs of the adjacent shroud segments in a cooling air plenum at least partly defined by a sealing ring mounted in a leading edge or trailing edge cavity of the shroud segments, reusing said cooling air to provide impingement cooling on an adjacent component, wherein the adjacent component comprises a stator vane assembly, the stator vane assembly having an axially facing sealing contact surface and the sealing ring having a cylindrical stub extending axially towards the stator vane assembly and having a corresponding sealing contact surface, and sealing the cylindrical stub against the stator vane assembly in response to thermal expansion of the stator vane assembly and the shroud segments during engine operation.

12. The method defined in claim 11, further comprising reusing the cooling air after impingement cooling to purge a gap between the adjacent component and the shroud segments.

13. The method defined in claim 11, wherein reusing said cooling air to provide impingement cooling comprises causing the cooling air to flow through impingement holes aiming at said adjacent component.

14. The method defined in claim 13, wherein the capturing step comprises mounting the sealing ring in a circumferential groove defined in a radially outer surface of the shroud segments, the sealing ring being in sealing contact with a shroud support structure to which the shroud segments are mounted, and wherein the impingement holes are defined in the sealing ring.

* * * * *